United States Patent
Song et al.

(10) Patent No.: US 9,241,283 B2
(45) Date of Patent: Jan. 19, 2016

(54) TRANSMISSION AND RECEPTION OF CHANNEL STATE INFORMATION

(75) Inventors: Hyung Joon Song, Seoul (KR); Jong Sik Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 44 days.

(21) Appl. No.: 14/123,188

(22) PCT Filed: Jul. 17, 2012

(86) PCT No.: PCT/KR2012/005673
§ 371 (c)(1),
(2), (4) Date: Nov. 29, 2013

(87) PCT Pub. No.: WO2013/012235
PCT Pub. Date: Jan. 24, 2013

(65) Prior Publication Data
US 2014/0092814 A1    Apr. 3, 2014

(30) Foreign Application Priority Data
Jul. 18, 2011  (KR) .......................... 10-2011-0071096

(51) Int. Cl.
*H04W 4/00*     (2009.01)
*H04W 24/10*    (2009.01)
*H04B 7/06*     (2006.01)

(52) U.S. Cl.
CPC ............. *H04W 24/10* (2013.01); *H04B 7/0626* (2013.01); *H04B 7/0663* (2013.01)

(58) Field of Classification Search
CPC .... H04W 24/10; H04B 7/0663; H04B 7/0626
USPC ........................................................ 370/328
See application file for complete search history.

(56) References Cited

U.S. PATENT DOCUMENTS

| | | | |
|---|---|---|---|
| 8,020,075 B2 * | 9/2011 | Kotecha | 714/776 |
| 8,737,518 B2 * | 5/2014 | Tosato | 375/295 |
| 8,873,650 B2 * | 10/2014 | Zhuang et al. | 375/260 |
| 2009/0080546 A1 | 3/2009 | Zhao et al. | |
| 2010/0172256 A1 | 7/2010 | Mallik et al. | |

(Continued)

FOREIGN PATENT DOCUMENTS

WO    2006/106693 A1    10/2006
WO    2010/036037 A2    4/2010

(Continued)

OTHER PUBLICATIONS

Hyungjoon Song et al., "Compressive Feedback Based on Sparse Approximation for Multiuser MIMO Systems", IEEE Transactions on Vehicular Technology, Feb. 2010, pp. 1017-1023, vol. 59, Issue No. 2.

*Primary Examiner* — Mohammad Anwar
*Assistant Examiner* — Kokou R Detse
(74) *Attorney, Agent, or Firm* — IP Legal Services, LLC

(57) ABSTRACT

The present disclosure is related to reporting channel state information associated with a downlink channel in a wireless communication system. In particular, a method of transmitting the channel state information in user equipment may include extracting one or more reference vectors having a high correlation with a channel state information vector associated with a downlink, creating one or more compressed vectors by compressing the one or more reference vectors, and transmitting the one or more compressed vectors.

11 Claims, 3 Drawing Sheets

(56) References Cited

U.S. PATENT DOCUMENTS

2011/0111747 A1* 5/2011 Tosato .................. 455/422.1
2011/0206106 A1* 8/2011 Mallik et al. .............. 375/226

FOREIGN PATENT DOCUMENTS

| WO | 2010/080231 A1 | 7/2010 |
| WO | 2011/017459 A2 | 2/2011 |

* cited by examiner

TRANSMISSION AND RECEPTION OF CHANNEL STATE INFORMATION

CROSS REFERENCE TO RELATED APPLICATIONS

This application is a National Stage Patent Application of PCT International Patent Application No. PCT/KR2012/005673 (filed on Jul. 17, 2012) under 35 U.S.C. §371, which claims priority to Korean Patent Application No. 10-2011-0071096 (filed on Jul. 18, 2011), the teachings of which are incorporated herein in their entireties by reference.

TECHNICAL FIELD

The present disclosure relates to reporting channel state information associated with a downlink channel in a wireless communication system.

BACKGROUND ART

In order to overcome a frequency shortage problem, a next generation wireless communication system is being developed such that every base station can use an entire available bandwidth. However, it may result in inter-cell interference since the same band width may be used at cell edges. In order to overcome such problem, in the next generation wireless communication system, coordinated multi-point transmission/reception (CoMP) techniques may be considered. Particularly, a CoMP-joint processing (JP) technique among CoMP techniques may enable a plurality of transmission points to simultaneously transmit data to one user equipment. Accordingly, such CoMP-JP technique may not cause interference and also provide a transmission point diversity effect, and therefore may improve performance at cell edges.

In order to employ such technique (e.g., CoMP-JP), channel state information may be required to be accurately reported in a downlink channel corresponding to a communication path from each transmission point to user equipment. Furthermore, reporting of channel state information may be required so as to not cause large feedback overhead.

DISCLOSURE OF INVENTION

Technical Problem

An object of the present embodiment is to provide methods for transmitting and receiving channel state information such that feedback overhead is reduced and also a reliability (or accuracy) of channel state information is improved, and to provide user equipment and a transmission point therefor.

Technical Solution

In order to accomplish the above-described object, a method according to at least one embodiment may be provided for transmitting channel state information in user equipment including a transceiver. The method may include extracting one or more reference vectors having a high correlation with a channel state information vector associated with a downlink; creating one or more compressed vectors by compressing the one or more reference vectors; and transmitting, by the transceiver, the one or more compressed vectors.

In accordance with another embodiment, user equipment may be provided. The user equipment may include a sparsity transform processor, a compression processor, and a transceiver. The sparsity transform processor may be configured to extract one or more reference vectors having a high correlation with a channel state information vector associated with a downlink. The compression processor may be configured to create one or more compressed vectors by compressing the one or more reference vectors. The transceiver may be configured to transmit the one or more compressed vectors.

In accordance with still another embodiment, a method may be provided for receiving channel state information in a transmission point including a transceiver. The method may include receiving, by the transceiver, one or more compressed vectors from user equipment; creating one or more decompressed vectors by decompressing the one or more compressed vectors; extracting one or more restoration vectors having a high correlation with the one or more decompressed vectors; and creating a channel information vector by adding the one or more restoration vectors.

Advantageous Effects

In case of reporting channel state information, the above-described present embodiment may reduce feedback overhead and also improve a reliability (or accuracy) of the channel state information.

MODE FOR CARRYING OUT THE INVENTION

Figure 1:
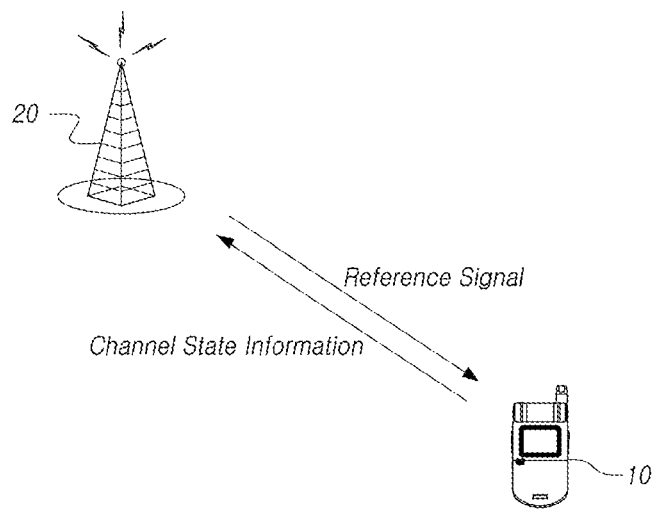
FIG. 1 illustrates a telecommunication system to which the present embodiments may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

FIG. 1 illustrates a telecommunication system to which the present embodiments may be applied.

The telecommunication system may be widely used in order to provide a variety of communication services such as a voice service, a packet data service, and so forth.

Referring to FIG. 1, the telecommunication system may include user equipment (UE) 10 and transmission point 20. Herein, transmission point 20 may perform uplink and downlink communications with user equipment 10.

In the present specification, the term "user equipment (UE)" (e.g., user equipment 10) is used as a general concept that includes a user terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

Generally, transmission point 20 or a cell may indicate a station that communicates with user equipment 10. Such a transmission point may be referred to as different terms, for example, a base station (BS), a Node-B, an evolved Node-B (eNB), a base transceiver system (BTS), an access point (AP), a relay node (RN), and the like.

In the present specification, transmission point 20 or the cell may be construed as an inclusive concept indicating a portion of an area covered by a base station controller (BSC) in code division multiple access (CDMA), a Node-B in WCDMA, and the like. Furthermore, transmission point 20 or the cell may be construed as an inclusive concept indicating all types of devices capable of communicating with one user equipment. For example, transmission point 20 or the cell may include a remote radio head (RRH) connected to a base station, a relay node (RN), a sector of a macrocell, a site, a microcell (e.g., a femtocell, a picocell), or the like.

In the present specification, user equipment 10 and transmission point 20 may be transmission/reception subjects, having an inclusive meaning, which are used to embody the technology and the technical concept disclosed herein, and may not be limited to a specific term or word.

FIG. 1 illustrates one user equipment (e.g., 10) and one transmission point (e.g., 20). However, the present embodiment is not limited thereto. More specifically, one transmission point (e.g., 20) may communicate with a plurality of user equipments (e.g., 10, and so forth). Alternatively, one user equipment (e.g., 10) may communicate with a plurality of transmission points (e.g., 20, and so forth).

The communication system may use a variety of multiple access schemes such as code division multiple access (CDMA), time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. The present embodiment may be applied to such a variety of multiple access schemes.

In addition, in the case of an uplink transmission and a downlink transmission, at least one of a time division duplex (TDD) scheme, a frequency division duplex (FDD) scheme, and a hybrid duplexing scheme may be used. Herein, the TDD scheme may perform the uplink/downlink transmissions using different times. The FDD scheme may perform the uplink/downlink transmissions using different frequencies. The hybrid duplexing scheme may be a scheme which combines the FDD scheme and the TDD scheme. The present embodiment may be applied to the TDD scheme, the FDD scheme, and/or the hybrid duplexing scheme.

More specifically, the present embodiment may be applied in the field of asynchronous wireless communications evolving to LTE and LTE-advanced (LTE-A) through GSM, WCDMA, and HSPA, and in the field of synchronous wireless communications evolving into CDMA, CDMA-2000, and UMB. Particularly, the present embodiment should not be construed as being limited to or restricted by a particular wireless communication field, and should be construed as including all technical fields to which the spirit of the present embodiment can be applied.

Referring to FIG. 1, user equipment 10 and transmission point 20 may perform uplink and downlink communications.

Transmission point 20 may perform a downlink transmission to user equipment 10. Transmission point 20 may transmit a physical downlink shared channel (PDSCH) which corresponds to a main physical channel used for unicast transmission. Furthermore, transmission point 20 may transmit control channels such as a physical downlink control channel (PDCCH), a physical control format indicator channel (PCFICH), and/or a physical HARQ indicator channel (PHICH). Herein, the PDCCH may be used to transmit downlink control information, such as scheduling information required for reception of PDSCH, and to transmit scheduling grant information for an uplink data channel (e.g., PUSCH) transmission. The PCFICH may be used to transmit an indicator informing a division of a PDSCH region and a PDCCH region. The PHICH may be used for transmission of 'hybrid automatic repeat request (HARQ)' acknowledgements in response to an uplink transmission. Hereinafter, "transmit or receive a signal through a channel" may be referred to as the expression of "transmit or receive a channel."

Transmission point 20 may transmit reference signals on the downlink. Herein, the reference signals (i.e., downlink reference signals) may include a cell-specific reference signal (CRS), a multicast/broadcast over single frequency network reference signal (MBSFN-RS), a UE-specific reference signal (may be referred to as a demodulation reference signal (DM-RS)), a positioning reference signal (PRS), and/or a channel state information reference signal (CSI-RS).

User equipment 10 may perform an uplink transmission to transmission point 20. User equipment 10 may transmit a physical uplink shared channel (PUSCH) which corresponds to a main physical channel used for unicast transmission. Furthermore, user equipment 10 may transmit a physical uplink control channel (PUCCH) used for transmission of uplink control information (UCI) such as an HARQ acknowledgement, a channel state report, a scheduling request, and so forth. Herein, the HARQ acknowledgement may indicate whether a downlink transport block was successfully received. The scheduling request may be a request for a resource allocation for an uplink data transmission.

User equipment 10 may transmit a demodulation reference signal (DRS) and a sounding reference signal (SRS) on an uplink.

In order to overcome a frequency shortage problem, a next generation wireless communication system is being developed such that every transmission point can use an entire available bandwidth. However, it may result in severe inter-cell interference since the same bandwidth may be used at cell edges.

In order to overcome such problem, coordinated multi-point transmission/reception (CoMP) techniques may be considered. Such CoMP techniques may be classified into a CoMP coordinated scheduling/beamforming (CS/CB) technique and a CoMP-joint processing (JP) technique. According to the CoMP CS/CB technique, user equipment may communicate with one of a plurality of transmission points, and the transmission points may be connected to each other to exchange information on scheduling and beamforming.

Figure 2:
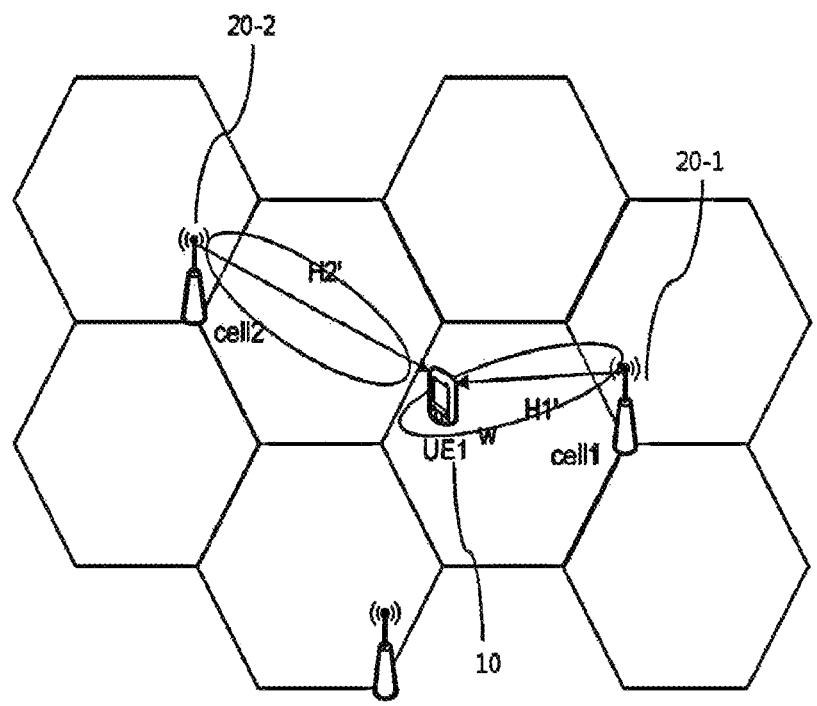
FIG. 2 illustrates an exemplary system to which a CoMP-JP technique may be applied.

FIG. 2 illustrates an exemplary system to which a CoMP-JP technique may be applied. User equipment 10 (UE 1) at a cell edge may communicate with a plurality of transmission points (e.g., 20-1, 20-2). In other words, user equipment 10 may receive data from a plurality of transmission points (e.g., 20-1, 20-2), and combine data signals received from the plurality of transmission points (e.g., 20-1, 20-2). Accordingly, performance at cell edges may be improved.

In order to perform a scheduling such that user equipment 10 can receive data from a plurality of transmission points (e.g., 20-1, 20-2), states of downlink channels from the plurality of transmission points (e.g., 20-1, 20-2) are required to be known. For this, schemes using at least one of an implicit feedback, an explicit feedback, and an SRS may be applied.

In a case of the implicit feedback, user equipment 10 may measure a downlink channel state based on a downlink reference signal(s) (e.g., CRS, CSI-RS, etc.) transmitted from a transmission point(s) (e.g., 20-1 and/or 20-2). Hereinafter, the terms "measure" and "measurement" are used as an inclusive concept including the terms "estimate" and "estimation." User equipment 10 and the transmission point(s) (e.g., 20-1 and/or 20-2) may have the same predetermined codebook. Accordingly, user equipment 10 may obtain (or find) an index of the most similar vector to the measured channel state, from the codebook, and may feedback the obtained index to one or a plurality of transmission points (e.g., 20-1 and/or 20-2). Such implicit feedback scheme has an advantage of less feedback overhead. However, in a case of CoMP operations, a performance improvement effect may not be large since only less information is fed back.

In a case of the explicit feedback, user equipment 10 may measure a downlink channel state based on a downlink reference signal(s) (e.g., CRS, CSI-RS, etc.) transmitted from a transmission point(s) (e.g., 20-1 and/or 20-2). User equipment 10 may feedback information itself on the measured channel state to the transmission point(s) (e.g., 20-1 and/or 20-2). Such explicit feedback scheme has an advantage of enabling application of an improved transmission method by accurately measuring channel states. However, such explicit feedback scheme may be less effective since feedback overhead associated with a channel matrix, a channel covariance matrix, eigenvectors, and eigenvalues is large.

The SRS may be transmitted on a symbol on an uplink from user equipment 10 for a channel state measurement. The transmission point(s) (e.g., 20-1 and/or 20-2) may receive the SRS and measure an uplink channel state using the received SRS. Furthermore, the transmission point(s) (e.g., 20-1 and/or 20-2) may measure a downlink channel state from the uplink channel state measured based on the SRS. Such channel state measurement using an SRS has an advantage of directly obtaining a channel state without an additional signal processing. However, in case of FDD, a channel state measured on an uplink (i.e., an uplink channel state) may be difficult to apply to scheduling for a downlink since the downlink and uplink use different frequencies.

Hereinafter, the present embodiment may provide an explicit feedback scheme enabling to reduce overhead.

Figure 3:
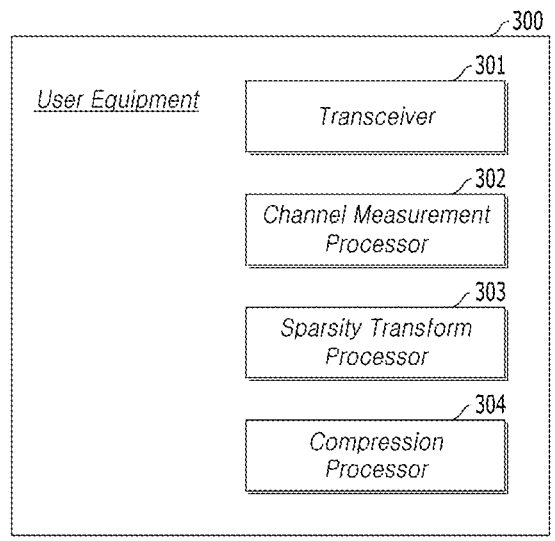
FIG. 3 illustrates a structure of user equipment in accordance with at least one embodiment.
Figure 4:
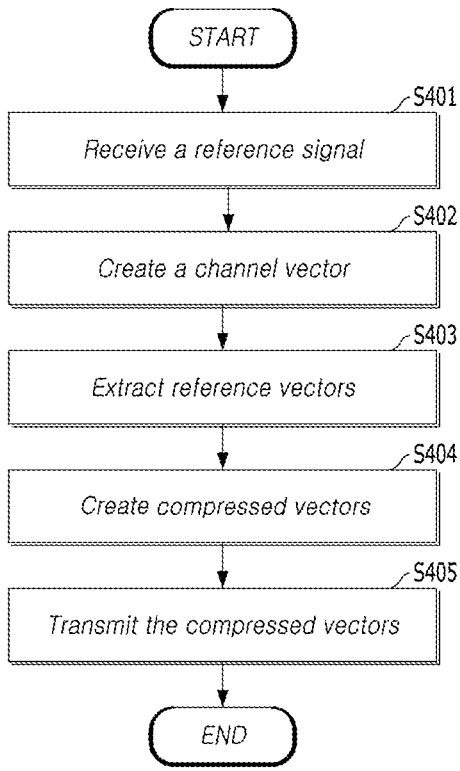
FIG. 4 illustrates a method of transmitting channel state information (CSI) in the user equipment illustrated in FIG. 3.

FIG. 3 illustrates a structure of user equipment 300 in accordance with at least one embodiment. FIG. 4 illustrates a method of transmitting channel state information (CSI) in user equipment 300 illustrated in FIG. 3.

Referring to FIG. 3, user equipment 300 may include transceiver 301, channel measurement processor 302, sparsity transform processor 303, and compression processor 304.

Referring to FIG. 3 and FIG. 4, at step S401, transceiver 301 may receive a reference signal (e.g., CRS, CSI-RS, or the like) for channel measurement, from one or more transmission points. At step S402, channel measurement processor 302 may measure a downlink channel state based on the reference signal which is received by transceiver 301. Furthermore, channel measurement processor 302 may create a channel vector including information on the measured channel state.

At step S403, sparsity transform processor 303 may transform the channel vector created by channel measurement processor 302 into one or more reference vectors. In the case that a channel vector ($\vec{C}$) is a row vector having an l number of components, correlation between 'each row of a sparse domain transformation matrix (F)' and 'the channel vector ($\vec{C}$)' may be obtained by multiplying the sparse domain transformation matrix (F) having a size of l*l by the channel vector ($\vec{C}$). Herein, 'l' may be a positive integer. In this case, one or more columns having a highest correlation may be selected as a reference vector ($\vec{S}$) having an/number of components.

Herein, the sparse domain transformation matrix (F) may be a square matrix.

In at least one embodiment, the sparse domain transformation matrix (F) may be a unitary discrete Fourier transform (DFT) matrix having a size of l*l, as described in Formula 1 below.

$$F = \frac{1}{\sqrt{l}} \begin{bmatrix} 1 & 1 & 1 & & 1 \\ 1 & \omega & \omega^2 & \ldots & \omega^{(l-1)} \\ 1 & \omega^2 & \omega^4 & & \omega^{2(l-1)} \\ \vdots & & & \ddots & \vdots \\ 1 & \omega^{l-1} & \omega^{2(l-1)} & \ldots & \omega^{(l-1)^2} \end{bmatrix}, \omega = e^{-j\frac{2\pi}{l}}$$ [Formula 1]

The unitary discrete Fourier transform (DFT) matrix of Formula 1 may be an example. Various types of unitary matrices may be used as the sparse domain transformation matrix (F). If a unitary matrix is designed such that columns of the unitary matrix are orthogonal each other, channel information may be sustained even in a sparse domain, and therefore an accuracy (or reliability) of feedback information may increase.

The number of selected reference vectors ($\vec{S}$) may be determined according to sparsity levels which are determined between user equipment and a transmission point. For example, in the case that the sparsity level is "1", in a sparse domain transformation matrix (F), one column vector having the highest correlation with a channel vector ($\vec{C}$) may be selected as a reference vector ($\vec{S}$).

In the case that the sparsity level is "2" or higher, in a sparse domain transformation matrix (F), two or more column vectors having relatively higher correlations with a channel vector ($\vec{C}$) may be selected as reference vectors ($\vec{S}$). Furthermore, a weight (i.e., a weight value) for each reference vector ($\vec{S}$) may be obtained. In this case, weights of reference vectors may be obtained such that a weight for each reference vector ($\vec{S}$) is in proportion to a correlation with each reference vector ($\vec{S}$) and a summation of weights is "1". Alternatively, a weight for each reference vector ($\vec{S}$) may be obtained by applying two or more selected reference vectors ($\vec{S}$) to a least square method (LSM).

In some embodiments, in the case that the sparsity level is "2" or higher, one column vector having the highest correlation with a channel vector ($\vec{C}$) may be determined in a sparse domain transformation matrix (F), and a weight for the one column vector may be obtained using a least square method (LSM). After subtracting a product of the column vector and its weight from the channel vector ($\vec{C}$), one column vector having the highest correlation and a corresponding weight may be obtained from the result vector(s) again. Such operations may be repetitively performed until column vectors and weights as many as the number corresponding to the sparsity level are obtained.

In other embodiments, in the case that the sparsity level is "2" or higher, all column vectors in a sparse domain transformation matrix (F) may be determined, and weights for the all column vectors may be obtained using a least square method (LSM). Accordingly, column vectors and weights as many as the number corresponding to the sparsity level may be obtained.

The weights (i.e., weight values) may be managed as separate data. Furthermore, a reference vector ($\vec{S}$) may be updated as a result value created by multiplying the reference vector ($\vec{S}$) by a corresponding weight.

A sparse domain transformation matrix (F) may be a predetermined matrix. Alternatively, a sparse domain transformation matrix (F) may be determined by a transmission point. In this case, the determined sparse domain transformation matrix (F) may be transferred to user equipment from the transmission point (i) through a higher-layer signal (e.g., radio resource control (RRC) signal) or (ii) through a downlink control channel (e.g., PDCCH). Alternatively, a sparse domain transformation matrix (F) may be determined by user equipment. In this case, the determined sparse domain transformation matrix (F) may be transferred to a transmission point from the user equipment through an uplink control channel (e.g., PUCCH).

A sparsity level may be a predetermined value. Alternatively, a sparse sparsity level may be determined by a transmission point. In this case, the determined sparsity level may be transferred to user equipment from the transmission point (i) through a higher-layer signal (e.g., RRC signal) or (ii) through a downlink control channel (e.g., PDCCH). Alternatively, a sparsity level may be determined by user equipment. In this case, the determined sparsity level may be transferred to a transmission point from the user equipment through an uplink control channel (e.g., PUCCH).

At step S404, compression processor 304 may create (or extract) one or more compressed vectors ($\vec{v}$) by compressing the one or more reference vectors ($\vec{S}$) obtained by sparsity transform processor 303.

An optimization matrix (O) may be prepared for a compression of the reference vectors ($\vec{S}$). The optimization matrix (O) may be a matrix which has a size of $2^p*l$ (where $l \le 2^p(2^p+1)$ and p is a prime number) and whose rows are orthogonal to each other. For example, in the case that the prime number 'p' is 2 (i.e., p=2), the optimization matrix (O) may have a size of 4*l (where $l \le 20$). In the case that the prime number 'p' is 3 (i.e., p=3), the optimization matrix (O) may have a size of 8*l (where $l \le 72$). Herein, the optimization matrix (O) may be formed by a product (i.e., O=CF) of a compression matrix (C) and sparse domain transformation matrix (F). In at least one embodiment, an optimization matrix (O) may be formed using a Hadamard matrix. In other embodiments, an optimization matrix (O) may be formed using a Grassmannian manifold design scheme. Herein, a matrix according to the Grassmannian manifold design scheme may have an optimal characteristic since correlations between all columns are the same. However, in case of the Grassmannian manifold design scheme, only a specific size of matrix may be formed, and each column is required to be heuristically determined.

Accordingly, a compression matrix (C) may be determined by Formula 2 below.

$$C = OF^H \quad \text{[Formula 2]}$$

Herein, 'H' represents a Hermitian operator. The above-described optimization matrix (O) may be determined such that cross correlations between all columns of the compression matrix (C) are maximized and a compression rate is relatively maximal.

In Formula 2, the compression matrix (C) may have a size of $2^p*l$.

An optimization matrix (O) and/or a compression matrix (C) may be predetermined values. Alternatively, an optimization matrix (O) and/or a compression matrix (C) may be determined by a transmission point. In this case, the determined optimization matrix (O)/compression matrix (C) or indicators therefor may be transferred to user equipment from the transmission point (i) through a higher-layer signal (e.g., RRC signal) or (ii) through a downlink control channel (e.g., PDCCH).

As shown in the following Formula 3, a compressed vector ($\vec{v}$) may be calculated by multiplying a compression matrix (C) by one or more reference vectors (S).

$$\vec{v} = C \cdot \vec{S} \quad \text{[Formula 3]}$$

The compressed vector $\vec{v}$ calculated by the above-described Formula 3 may be a row vector formed by a $2^p$ number of components. Compressed vectors $\vec{v}$ as many as the number corresponding to a sparsity level may be calculated by Formula 3.

In addition, at step S405, transceiver 301 may transmit one or more compressed vectors $\vec{v}$ created in compression processor 304, to a transmission point.

Example 1-1

Description will be given under the assumption that a channel vector ($\vec{C}$) to be transmitted by user equipment 300 is a matrix having 20 components, as follows. Herein, the channel vector ($\vec{C}$) may include channel information.

$$\vec{C} = [1\ -1\ 1\ -1\ 1\ -1\ 1\ -1\ 1\ -1\ 1\ -1\ 1\ -1\ 1\ -1\ 1\ -1\ 1\ -1]^T/\sqrt{20}$$

A unitary DFT matrix having a size of 20*20 as shown in Formula 4 below may be used as a sparse domain transformation matrix (F).

$$F = \frac{1}{\sqrt{20}} \begin{bmatrix} 1 & 1 & 1 & \cdots & 1 \\ 1 & \omega & \omega^2 & \cdots & \omega^{19} \\ 1 & \omega^2 & \omega^4 & \cdots & \omega^{38} \\ \vdots & & & \ddots & \vdots \\ 1 & \omega^{19} & \omega^{38} & \cdots & \omega^{361} \end{bmatrix}, \omega = e^{-j\frac{2\pi}{20}} \quad \text{[Formula 4]}$$

In the case that a sparsity level is determined as "1", among columns of the above-described sparse domain transformation matrix (F), a column having the highest correlation with the channel vector ($\vec{C}$) may be found, and be determined as a reference vector ($\vec{S}$). In the above-described example, a result vector according to a product of the sparse domain transformation matrix (F) and the channel vector ($\vec{C}$) may be as below.

$$F\vec{C} = [0\ 0\ 0\ 0\ 0\ 0\ 0\ 0\ 0\ 0\ 1\ 0\ 0\ 0\ 0\ 0\ 0\ 0\ 0\ 0]^T$$

From the result vector, it may be known that the $11^{th}$ column vector of the sparse domain transformation matrix (F) has the highest correlation with the channel vector ($\vec{C}$).

Accordingly, a reference vector ($\vec{S}$) determined as the $11^{th}$ column vector of the sparse domain transformation matrix (F) may be as below.

$$\vec{S} = [1\ -1\ 1\ -1\ 1\ -1\ 1\ -1\ 1\ -1\ 1\ -1\ 1\ -1\ 1\ -1\ 1\ -1\ 1\ -1]^T/\sqrt{20}$$

In the case that the prime number 'p' is 2 (i.e., p=2), an optimization matrix (O) may be a matrix having a size of 4*20 as shown in Formula 5 below.

$$O = CF = \left[ I_4 \mid \frac{1}{2}D_1 H_4 \mid \frac{1}{2}D_2 H_4 \mid \frac{1}{2}D_3 H_4 \mid \frac{1}{2}D_4 H_4 \right] \quad \text{[Formula 5]}$$

In Formula 5, $I_4$ represents a unit matrix having a size of 4*4. $H_4$ represents a 4*4 Hadamard matrix (i.e., Hadamard matrix having a size of 4*4) as below.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

A Hadamard matrix may be a square matrix including values of "1" or "−1". Furthermore, the Hadamard matrix may have a characteristic that each column of the Hadamard matrix is orthogonal to each other.

Meanwhile, in the case that the prime number 'p' is 3 (i.e., p=3), an 8*8 Hadamard matrix ($H_8$) may be used for configuration of an optimization matrix (O). $H_8$ may be as follows.

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

$D_k$, (k=1, 2, 3, or 4) may be a value indicating an optimal phase rotation parameter of a Hadamard matrix, and be determined such that cross correlations between all columns of a compression matrix (C) are maximized and a compression rate is relatively maximal. In case of Example 1, $D_k$ may be matrices shown in Formula 6 below.

$$D_1 = \text{diag}\left(\left[ e^{j\frac{\pi}{4}}\ e^{j\frac{\pi}{4}}\ e^{j\frac{\pi}{4}}\ e^{j\frac{\pi}{4}} \right]\right), \quad \text{[Formula 6]}$$

$$D_2 = \text{diag}\left(\left[ e^{j\frac{\pi}{4}}\ e^{j\frac{3\pi}{4}}\ e^{j\frac{3\pi}{4}}\ e^{j\frac{5\pi}{4}} \right]\right),$$

$$D_3 = \text{diag}\left(\left[ e^{j\frac{\pi}{4}}\ e^{j3\frac{\pi}{4}}\ e^{j\frac{\pi}{4}}\ e^{j\frac{7\pi}{4}} \right]\right),$$

$$D_4 = \text{diag}\left(\left[ e^{j\frac{\pi}{4}}\ e^{j\frac{\pi}{4}}\ e^{j\frac{3\pi}{4}}\ e^{j\frac{7\pi}{4}} \right]\right)$$

A compression matrix (C) may be a 4*20 matrix (i.e., a matrix having a size of 4*20) determined by Formula 2 ($C=OF^H$). In this case, a compressed vector ($\vec{v}$) created by a compression operation using the compression matrix (C) may be as below.

$$\vec{v} = C \cdot \vec{S} = 0.3536 \times [1+j\ -1+j\ -1\ -j\ -1+jj]^T$$

According to the above-described scheme, the channel vector $\vec{C}$ having 20 components may be compressed to the compressed vector ($\vec{v}$) having four components. The compressed vector $\vec{v}$ having four components may be transmitted from user equipment to a transmission point. Accordingly, feedback overhead may be reduced.

Example 1-2

Description will be given under the assumption that (i) a channel vector $\vec{C}$ to be transmitted by user equipment 300 is a matrix having 20 components, and (ii) the unitary DFT matrix defined by Formula 4 is used as a sparse domain transformation matrix (F). Herein, the channel vector $\vec{C}$ may include channel information. In this case, it may be assumed that a result vector according to a product of the sparse domain transformation matrix (F) and the channel vector $\vec{C}$ is as below.

$$F\vec{C} = [0.8\ 0\ 0\ 0\ 0\ 0\ 0\ 0\ 0\ 0\ 0.2\ 0\ 0\ 0\ 0\ 0\ 0\ 0\ 0\ 0]^T$$

In the case that the sparsity level is determined as "2", two column vectors (e.g., the $1^{st}$ column vector and the $11^{th}$ column vector) having higher correlations in the sparse domain transformation matrix (F) may be selected as two reference vectors (e.g., $\vec{s}_1$ and $\vec{s}_2$). Weights for the reference vectors (e.g., $\vec{s}_1$ and $\vec{s}_2$) may be determined as "0.8" and "0.2", respectively. Thereafter, each compressed vector (e.g., $\vec{v}_1$ or $\vec{v}_2$) may be calculated by compressing each reference vector (e.g., $\vec{s}_1$ or $\vec{s}_2$) by a compression matrix (C). Herein, each compressed vector (e.g., $\vec{s}_1$ and $\vec{s}_2$) may have four components. In addition, the compressed vectors (e.g., $\vec{v}_1$ or $\vec{v}_2$) each of which has four components, and the corresponding weights (e.g., 0.8 and 0.2) may be transmitted from user equipment to a transmission point.

Alternatively, the $1^{st}$ column vector and the $11^{th}$ column vector of the sparse domain transformation matrix (F) may be multiplied by the weights 0.8 and 0.2, respectively. In this case, the result vectors may be determined as reference vectors (e.g., $\vec{s}_1$ or $\vec{s}_2$). Thereafter, each compressed vector ($\vec{v}_1$ or $\vec{v}_2$) having four components may be calculated by compressing each reference vector (e.g., $\vec{s}_1$ or $\vec{s}_2$) by a compression matrix (C). In addition, the compressed vectors (e.g., $\vec{v}_1$ or $\vec{v}_2$) each of which has four components may be transmitted from user equipment to a transmission point.

Example 2-1

In the case that channel information to be transmitted by user equipment 300 includes an l number of components, a channel vector ($\vec{C}$) may be configured with (i) an l number of channel information components and (ii) a $[2^p(2^p+1)-l]$ number of '0' components. Herein, l may be less than $2^p(2^p+1)$. For example, in the case that the channel information includes 16 components (l=16), it may be assumed that the prime number 'p' is 2 (i.e., p=2) and a channel vector ($\vec{C}$) is the following matrix having 20 components.

$$\vec{C} = [1\ -1\ 1\ -1\ 1\ -1\ 1\ -1\ 1\ -1\ 1\ -1\ 1\ -1\ 1\ -1\ 0\ 0\ 0\ 0]^T/\sqrt{20}$$

In this case, a sparse domain transformation matrix (F) having a size of 20*20 may be a matrix defined by Formula 4 of Example 1, and an optimization matrix (O) having a size of 4*20 may be a matrix defined by Formula 5 of Example 1. One or more reference vectors ($\vec{S}$) having a high correlation with the channel vector $\vec{C}$ may be extracted from the sparse domain transformation matrix (F) defined by Formula 4. Herein, each reference vector ($\vec{S}$) may have 20 components. Thereafter, each reference vector ($\vec{S}$) having 20 components may compressed to a compressed vector ($\vec{v}$) having four components, by performing a compression operation using a compression matrix (e.g., $C=OF^H$). Herein, the compression matrix (e.g., $C=OF^H$) may be obtained from the sparse domain transformation matrix (F) defined by Formula 4 and the optimization matrix (O) defined by Formula 5.

Example 2-2

In the case that channel information to be transmitted by user equipment 300 includes an l number of components, a channel vector ($\vec{C}$) may be configured with only an l number of channel information components. Herein, l may be less than $2^p(2^p+1)$. For example, in the case that the channel information includes 16 components, it may be assumed that the prime number 'p' is 2 (i.e., p=2) and a channel vector ($\vec{C}$) is the following matrix having 16 (<20) components.

$$\vec{C} = [1\ -1\ 1\ -1\ 1\ -1\ 1\ -1\ 1\ -1\ 1\ -1\ 1\ -1\ 1\ -1]^T/\sqrt{16}$$

In this case, the following DFT matrix may be used as a sparse domain transformation matrix (F) having a size of 16*16.

$$F = \frac{1}{\sqrt{16}} \begin{bmatrix} 1 & 1 & 1 & & 1 \\ 1 & \omega & \omega^2 & \ldots & \omega^{15} \\ 1 & \omega^2 & \omega^4 & & \omega^{30} \\ \vdots & & & \ddots & \vdots \\ 1 & \omega^{15} & \omega^{30} & \ldots & \omega^{225} \end{bmatrix}, \omega = e^{-j\frac{2\pi}{16}}$$

One or more reference vectors ($\vec{S}$) having a relatively high correlation with the channel vector ($\vec{C}$) may be extracted from the sparse domain transformation matrix (F). Herein, each reference vector ($\vec{S}$) may have 16 components.

A matrix having a size of 4*16 may be selected as an optimization matrix (O). The 4*16 optimization matrix (O) may be formed by selecting arbitrary 16 columns in a 4*20 matrix (i.e., a matrix having a size of 4*20) defined by Formula 5.

For example, an optimization matrix (O) having a size of 4*16 may be formed by excluding a unit matrix ($I_4$) from the matrix defined by Formula 5. In other words, the optimization matrix (O) having a size of 4*16 may be $$O = CF = \left[ \frac{1}{2}D_1H_4 \mid \frac{1}{2}D_2H_4 \mid \frac{1}{2}D_3H_4 \mid \frac{1}{2}D_4H_4 \right].$$

Alternatively, an optimization matrix (O) having a size of 4*16 may be formed by excluding one Hadamard matrix from the matrix defined by Formula 5. In this case, for example, the optimization matrix (O) having a size of 4*16 may be $$O = CF = \left[ I_4 \mid \frac{1}{2}D_1H_4 \mid \frac{1}{2}D_2H_4 \mid \frac{1}{2}D_3H_4 \right].$$

Meanwhile, an compression matrix (e.g., $C=OF^H$) having a size of 4*16 may be obtained using the sparse domain transformation matrix (F) having a size of 16*16 and the optimization matrix (O) having a size of 4*16. Furthermore, a compressed vector ($\vec{v}$) having four components may be obtained from the compression matrix (C) having a size of 4*16 and the reference vector ($\vec{S}$) having 16 components.

Figure 5:
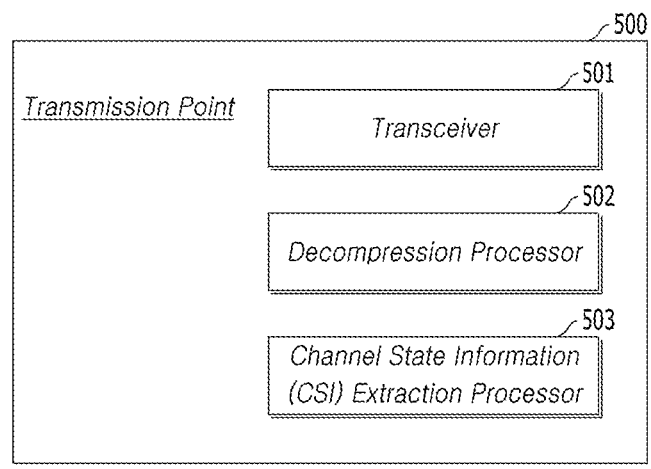
FIG. 5 illustrates a structure of a transmission point in accordance with at least one embodiment.
Figure 6:
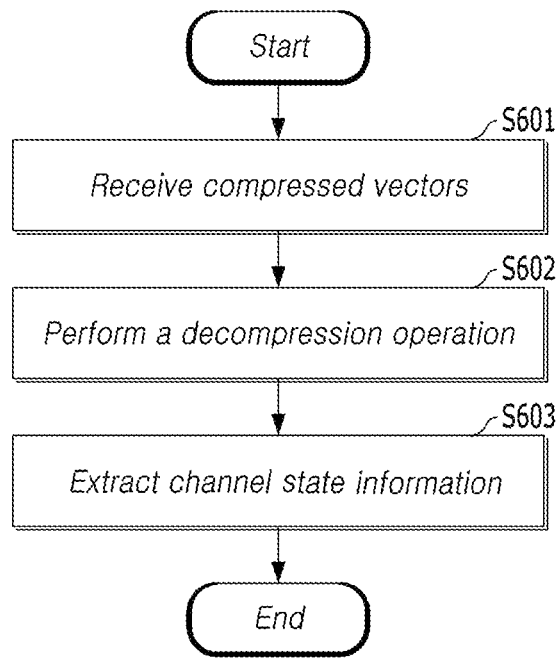
FIG. 6 illustrates a method of receiving channel state information (CSI) in the transmission point illustrated in FIG. 5.

FIG. 5 illustrates a structure of a transmission point (e.g., transmission point 500) in accordance with at least one embodiment. FIG. 6 illustrates a method of receiving channel state information (CSI) in the transmission point (e.g., transmission point 500) illustrated in FIG. 5.

Referring to FIG. 5, transmission point 500 may include transceiver 501, decompression processor 502, and channel state information (CSI) extraction processor 503.

At step S601, transceiver 501 may receive one or more compressed vectors ($\vec{v'}$) from user equipment. The received compressed vectors ($\vec{v'}$) may be 'transmitted compressed vectors' ($\vec{v'}$) (i.e., compressed vectors ($\vec{v'}$) transmitted by the user equipment) to which noise/interference effects of channels are added. The number of compressed vectors ($\vec{v'}$) may be determined according to a sparsity level. Each compressed vectors ($\vec{v'}$) may have a $2^p$ number of components. Herein, 'p' may be a prime number. In the case that the sparsity level is 2 or higher, and weights and compressed vectors are separately transmitted from user equipment, transceiver 501 may further receive weight information.

At step S602, decompression processor 502 may decompress each compressed vector ($\vec{v'}$). More specifically, decompression processor 502 may create one or more decompressed vectors ($\vec{d}$) by multiplying a Hermitian matrix ($O^H$) of a reference matrix (O) used in user equipment by compressed vector(s) ($\vec{v'}$), as shown in Formula 7 below. Herein, the decompressed vector ($\vec{d}$) may have an/number of components.

$$\vec{d} = O^H \cdot \vec{v'}$$ [Formula 7]

Channel state information (CSI) extraction processor 503 may obtain a correlation between each column of a sparse domain transformation matrix (F) and the decompressed vector(s) ($\vec{d}$), by multiplying the sparse domain transformation matrix (F) used in user equipment by the decompressed vector(s) ($\vec{d}$). In this case, one column having the highest correlation may be selected as a restoration vector ($\vec{r}$) having an l number of components. In the same manner, a restoration vector ($\vec{r}$) may be determined from each of one or more decompressed vectors ($\vec{d}$). Each restoration vector ($\vec{r}$) may have an l number of components.

At step S603, a channel information vector ($\vec{CI}$) including channel state information (CSI) may be obtained based on one or more restoration vectors ($\vec{r}$). In the case that a sparsity level is '1', the channel information vector ($\vec{CI}$) may be the same as the restoration vector ($\vec{r}$). In the case that a sparsity level is 2 or higher, and compressed vectors ($\vec{v'}$) are created considering weights in user equipment, the channel information vector ($\vec{CI}$) may be sum of the restoration vectors ($\vec{r}$). In the case that (i) a sparsity level is 2 or higher, (ii) compressed vectors ($\vec{v'}$) are created without considering weights in user equipment, and (iii) weights are separately transmitted, restoration vectors ($\vec{r}$) may be multiplied by weights. In this case, the channel information vector ($\vec{CI}$) may be sum of the multiplication results (i.e., sum of products of restoration vectors ($\vec{r}$) and weights).

In the above-described method, correlation between each column vector of a reference matrix (O) may be lowest. Accordingly, a probability of extracting a column vector of a sparse domain transformation matrix (F) corresponding to a channel vector transformed into a sparse domain may be maximal.

Meanwhile, steps S602 and S603 described above may be performed as a single step. A vector having an l number of components may be obtained by multiplying a Hermitian matrix ($C^H$) of a compression matrix (C=OF$^H$) used in user equipment by a compressed vector ($\vec{v'}$). A correlation between each column of a Hermitian matrix ($C^H$) of a compression matrix (C=OF$^H$) and a compressed vector ($\vec{v'}$) may be obtained from the obtained vector having an l number of components. In this case, a column having the highest correlation may be selected, and a column of a sparse domain transformation matrix (F) corresponding to the selected column (i.e., the column having the highest correlation) may be selected as a restoration vector ($\vec{r}$). For example, if a correlation between the 1$^{st}$ column of a Hermitian matrix ($C^H$) of a compression matrix (C) and a compressed vector ($\vec{v'}$) is highest, the 1$^{st}$ column of a sparse domain transformation matrix (F) may be selected as a restoration vector ($\vec{r}$).

In the above-described manner, in case of one or more compressed vectors ($\vec{v'}$), a restoration vector ($\vec{r}$) may be determined for each compressed vector ($\vec{v'}$). At step S603, a channel information vector ($\vec{CI}$) may be obtained from one or more restoration vectors ($\vec{r}$). More specifically, in the case that a sparsity level is '1' and, therefore, there is a single compressed vector ($\vec{v'}$), the channel information vector ($\vec{CI}$) may be determined as one restoration vector ($\vec{r}$). In the case that a sparsity level is higher than '1' and therefore there are a plurality of compressed vectors ($\vec{v'}$), the channel information vector ($\vec{CI}$) may be determined as a sum of restoration vectors ($\vec{r}$). Information included in the determined channel information vector ($\vec{CI}$) may be used when a transmission point (e.g., transmission point 500) performs a downlink scheduling.

For example, in the case that it is assumed that noise and interference effects of channels is negligible, a compressed vector ($\vec{v'}$) received by a transmission point may be the same as a compressed vector ($\vec{v}$) transmitted by user equipment. If Formula 2 and Formula 3 are applied to Formula 7, the following Formula 8 may be induced.

$$\vec{d} = O^H \vec{v'} = O^H O F^H \vec{S} = F^H \vec{S} \qquad \text{[Formula 8]}$$

Accordingly, in this case, a restoration vector ($\vec{r}$) may be the same as a reference vector ($\vec{S}$) of user equipment. Herein, the restoration vector ($\vec{r}$) may be a column vector having the highest correlation with a decompressed vector ($\vec{d}$), among column vectors of a sparse domain transformation matrix (F). In such manners, the reference vector ($\vec{S}$) in the user equipment may be restored in a transmission point.

For example, in the case that a sparsity level is '1', the prime number 'p' is 2 (i.e., p=2), and a channel vector ($\vec{C}$) is configured with 20 components, it may be assumed that a compressed vector ($\vec{v'}$) received by a transmission point (e.g., transmission point 500) is 0.3536[1+j−1+j−1−j−1+j]$^T$.

In the case that a reference matrix (O) used in user equipment is a matrix described in Formula 5, a decompressed vector ($\vec{d}$) according to Formula 7 may be calculated as [1 −1 1 −1 1 −1 1 −1 1 −1 1 −1 1 −1 1 −1 1 −1 1 −1]$^T$/√20.

In the case that a sparse domain transformation matrix (F) used user equipment is a matrix described in Formula 4, a restoration vector ($\vec{r}$) may be [1 −1 1 −1 1 −1 1 −1 1 −1 1 −1 1 −1 1 −1 1 −1 1 −1]$^T$/√20. Herein, the restoration vector ($\vec{r}$) may be a column vector having the highest correlation with the above-described decompressed vector ($\vec{d}$), among column vectors of the sparse domain transformation matrix (F).

A channel information vector ($\vec{CI}$) may be determined as [1 −1 1 −1 1 −1 1 −1 1 −1 1−1 1−1 1−1 1−1 1−1]$^T$/√20 since a sparsity level is '1'. A transmission point may extract downlink channel state information from the determined channel information vector ($\vec{CI}$). A downlink scheduling may be performed based on the extracted downlink channel state information.

Methods of transmitting and/or receiving a channel state according to the present embodiment described above may be embodied in the form of programs, and be recorded in a computer-readable recording medium.

A program recorded in a recording medium for implementation of a channel state transmission method according to at least one present embodiment may execute a function of transforming sparsity of a channel state information vector, a function of compressing the sparsity-transformed vector, and so forth. A program recorded in a recording medium for implementation of a channel state reception method according to at least one present embodiment may execute a function of decompressing a received compressed vector, a function of extracting a vector having the highest correlation with the decompressed vector, and so forth.

The above-described program may include program codes coded using computer languages such that a computer can read a program recorded in a recording medium and execute functions embodied by the program. Herein, the computer languages may be read through device interfaces by a processor (e.g., CPU) of the computer, and include C, C++, JAVA, a machine language, and/or the like.

Such codes may include function codes associated with functions defining the above-described capabilities (or functions). Furthermore, such codes may include execution-related control codes which are required to execute the above-described capabilities (or functions) according to a predetermined procedure by a computer processor.

Further, such codes may further include codes associated with a memory reference. Herein, the codes associated with the memory reference may indicate a memory position (i.e., a position in an internal or external memory of a computer, for example, address) at which additional information or media required to execute the above-described capabilities (or functions) by a computer processor can be referred.

Furthermore, in the case that a processor of a computer is required to communicate with other remote computers or servers in order to execute the above-described capabilities (or functions), such codes may further include codes associated with communications. Herein, the codes associated with communications may indicate a communication scheme (i.e., how to communicate with other remote computers or servers) and/or communication objects (e.g., information or media to be transmitted/received), when the processor of the computer communicates with the other remote computers or servers using a corresponding communication module.

Examples of the computer-readable recording medium to record the above-described program may include a read-only memory (ROM), a random-access memory (RAM), CD-ROMs, magnetic tapes, floppy disks, optical data storage devices, and the like. Furthermore, the computer-readable recording medium may include a medium embodied in the form of carrier waves (such as data transmission through the Internet).

The computer-readable recording medium may also be distributed over network coupled computer systems such that computer-readable codes are stored and executed in a distributed manner.

Also, functional programs, codes, and code segments for accomplishing the present invention may be easily construed or modified by programmers skilled in the art to which the present invention pertains, in view of considering a system environment of a computer which can read a recording medium and execute programs.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of transmitting channel state information in user equipment including a transceiver, the method comprising:
   extracting one or more reference vectors having a high correlation with a channel state information vector associated with a downlink;
   creating one or more compressed vectors by compressing the one or more reference vectors; and
   transmitting, by the transceiver, the one or more compressed vectors,
   wherein:
   the correlation is calculated by multiplying a square matrix by the channel state information vector, where columns of the square matrix are orthogonal to each other; and
   the reference vectors are column vectors having a high correlation in the square matrix.

2. The method of claim 1, wherein:
   the channel state information vector includes an l number of components indicating the channel state information, where l is a positive integer; and
   the square matrix is a matrix having a size of l*l.

3. The method of claim 1, wherein:
   the channel state information vector includes (i) an l number of components indicating the channel state information, where l is a positive integer, and (ii) a $2^p(2^p+1)-l$ number of components not indicating the channel state information, where p is a prime number; and
   the square matrix is a matrix having a size of $2^p(2^p+1)*(2^p+1)$.

4. The method of claim 1, wherein:
   the compressed vectors are calculated by multiplying a compression matrix by the reference vectors; and
   the compression matrix is a matrix having a size of $2^p*l$, where l is a positive integer satisfying $l \leq 2^p(2^p+0.1)$ and p is a prime number, in a case that the reference vectors have an l number of components.

5. User equipment comprising:
   a sparsity transform processor configured to extract one or more reference vectors having a high correlation with a channel state information vector associated with a downlink;
   a compression processor configured to create one or more compressed vectors by compressing the one or more reference vectors; and
   a transceiver configured to transmit the one or more compressed vectors,
   wherein:
   the correlation is calculated by multiplying a square matrix by the channel state information vector where columns of the square matrix are orthogonal to each other; and
   the reference vectors are column vectors having a high correlation in the square matrix.

6. The user equipment of claim 5, wherein:
   the channel state information vector includes an l number of components indicating the channel state information, where l is a positive integer; and
   the square matrix is a matrix having a size of l*l.

7. The user equipment of claim 5, wherein:
   the channel state information vector includes an l number of components indicating the channel state information, where l is a positive integer, and (ii) a $2^p(2^p+1)-l$ number of components not indicating the channel state information, where p is a prime number; and
   the square matrix is a matrix having a size of $2^p(2^p+1)*2^p(2^p+1)$.

8. The user equipment of claim 5, wherein:
   the compressed vectors are calculated by multiplying a compression matrix by the reference vectors; and
   the compression matrix is a matrix having a size of $2^p*l$, where l is a positive integer satisfying $l \leq 2^p(2^p+1)$ and p is a prime number, in a case that the reference vectors have an l number of components.

9. A method of receiving channel state information in a transmission point including a transceiver, the method comprising:
   receiving, by the transceiver, one or more compressed vectors from user equipment;

creating one or more decompressed vectors by decompressing the one or more compressed vectors;
extracting one or more restoration vectors having a high correlation with the one or more decompressed vectors; and
creating a channel information vector by adding the one or more restoration vectors,
wherein:
the decompressed vectors are calculated by multiplying a Hermitian matrix of a reference matrix by the compressed vectors, and
the reference matrix has a low cross correlation between column vectors.

10. The method of claim 9, wherein:
the compressed vectors have a $2^p$ number of components, where p is a prime number; and
the Hermitian matrix of the reference matrix is a matrix having a size of $l*2^p$, where 'l' represents the number of the channel state information, and is a positive integer satisfying $l \leq 2^p(2^p+1)$.

11. The method of claim 9, wherein:
the correlation is calculated by multiplying a square matrix by the decompressed vectors, where columns of the square matrix are orthogonal to each other; and
the restoration vectors are column vectors having a highest correlation in the square matrix.

\* \* \* \* \*